Aug. 21, 1945.     J. E. LUDWIG, SR     2,383,138
AIR CLEANER
Filed Feb. 1, 1943     3 Sheets-Sheet 1

INVENTOR.
JOHN E. LUDWIG. Sr.
BY
ATTORNEYS

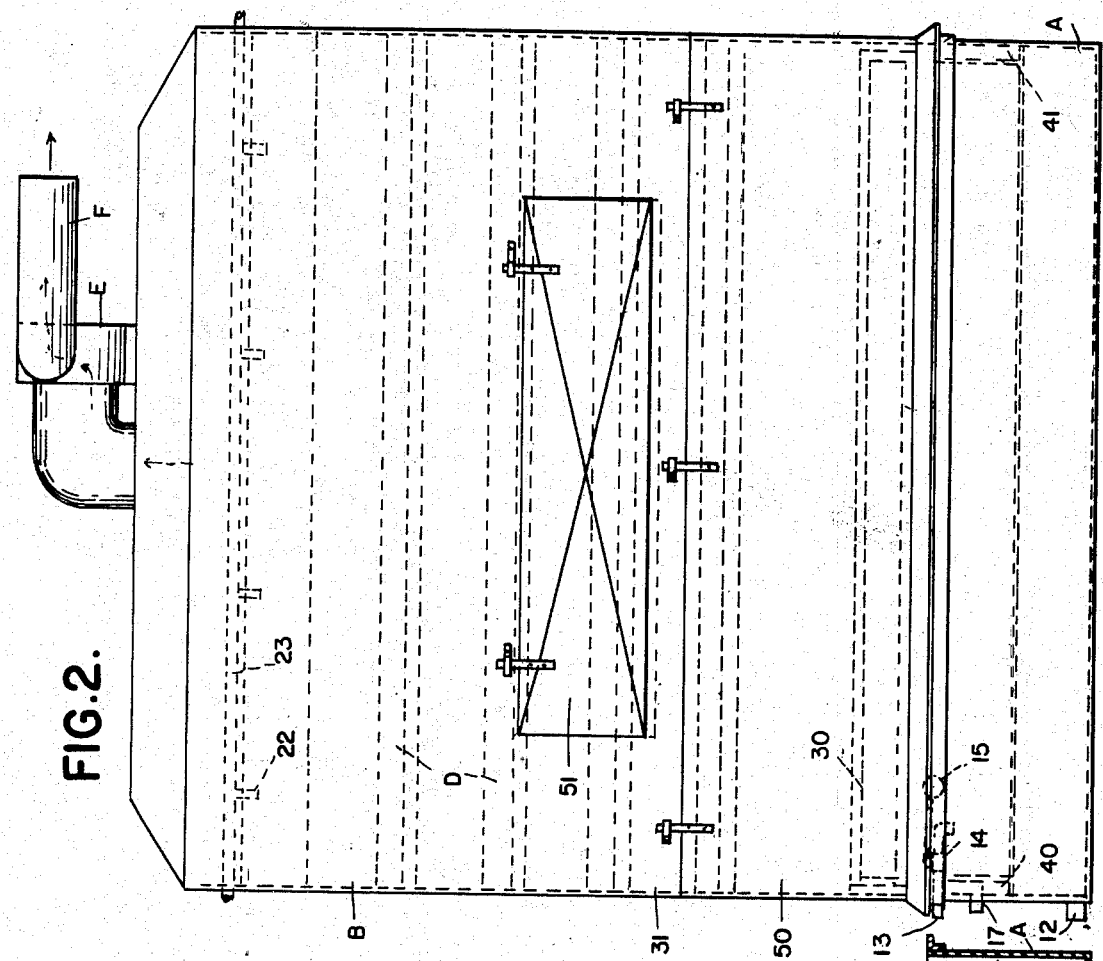
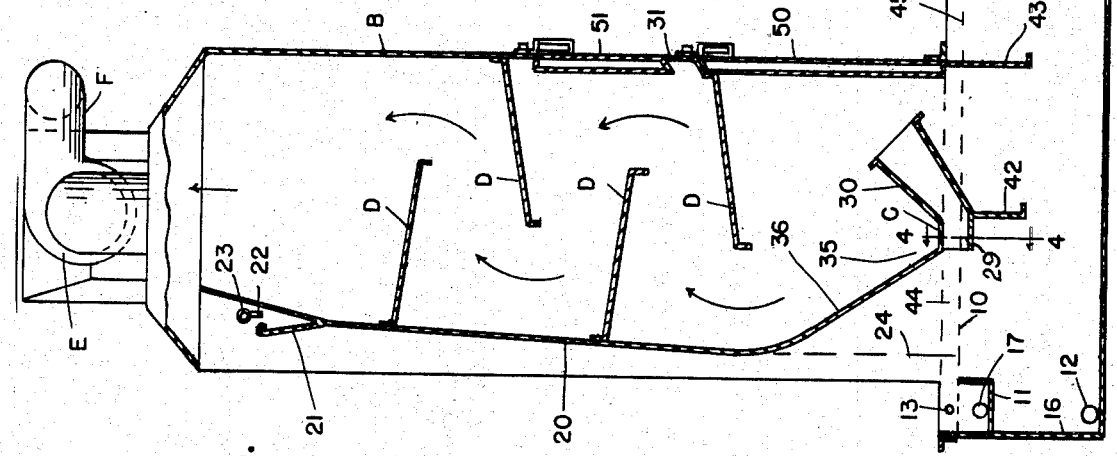
FIG.2.
FIG.3.
INVENTOR.
JOHN E. LUDWIG, Sr
BY
ATTORNEYS

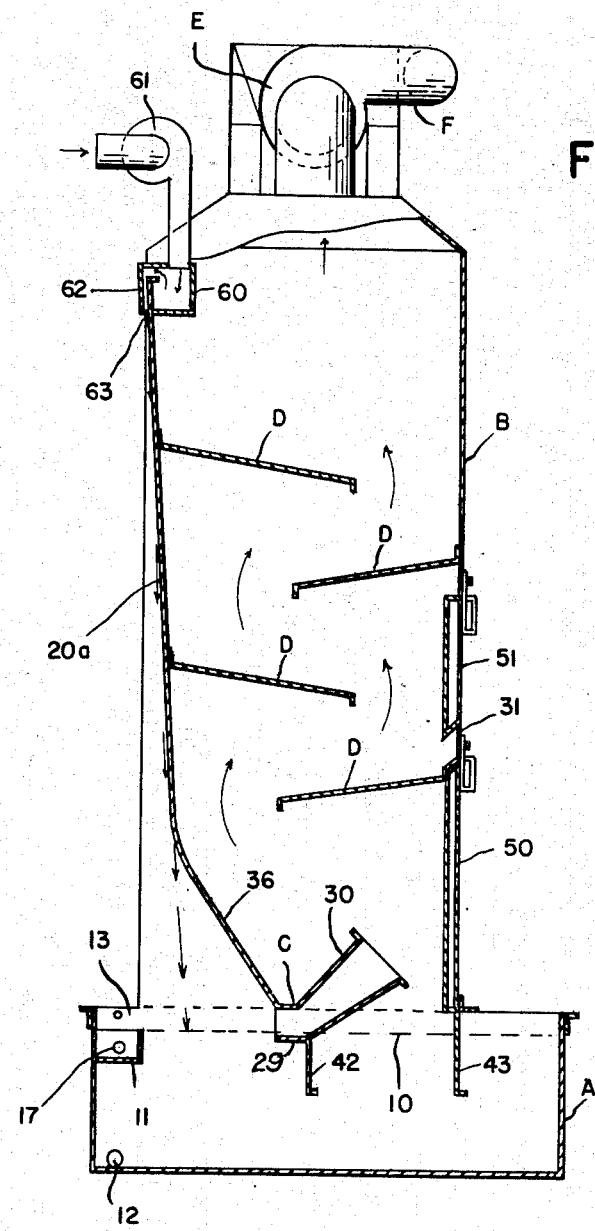

Patented Aug. 21, 1945

2,383,138

UNITED STATES PATENT OFFICE 2,383,138

AIR CLEANER

John E. Ludwig, Sr., Detroit, Mich., assignor to David-Ludwig Company, Detroit, Mich., a corporation of Michigan Application February 1, 1943, Serial No. 474,361

2 Claims. (Cl. 261—76)

This invention relates generally to air cleaners and refers more particularly to those adapted for use as a part of or in conjunction with paint spray booths for removing from the interior of the booths the poisonous and combustible fumes created during the spraying operation and for separating from the fume and paint laden air and collecting for salvage purposes the particles of lacquer, enamel or other paint substances which otherwise might be wasted.

One of the essential objects of the invention is to provide an air cleaner wherein provision is made for drawing into the cleaning chamber at relatively high velocity the fume and paint laden air and for effectively separating the paint particles from the air before it is blown back into the spray booth or room in which such booth is located.

Another object is to provide an air cleaner wherein the separation of the paint particles from the air is effected by commingling water with the air to wash and clean the same.

Another object is to provide an air cleaner that has an improved means for commingling the water with the paint laden air to insure the best results from a washing standpoint.

Another object is to provide an air cleaner wherein pumps and the like for the supply and circulation of water have been eliminated entirely. In the present instance, it is only necessary to maintain a desired water level to operate the cleaner continuously.

Another object is to provide an air cleaner that is simple in construction, economical to manufacture, easy to install and efficient in operation.

Other objects, advantages and novel details of construction of this invention will be made more apparent as this description proceeds, especially when considered in connection with the accompanying drawings, wherein:

Figure 2 is a rear elevation thereof;

Figure 3 is a vertical sectional view through the cleaner illustrated in Figures 1 and 2;

Figure 5 is a vertical sectional view through a slight modification.

Figure 1:
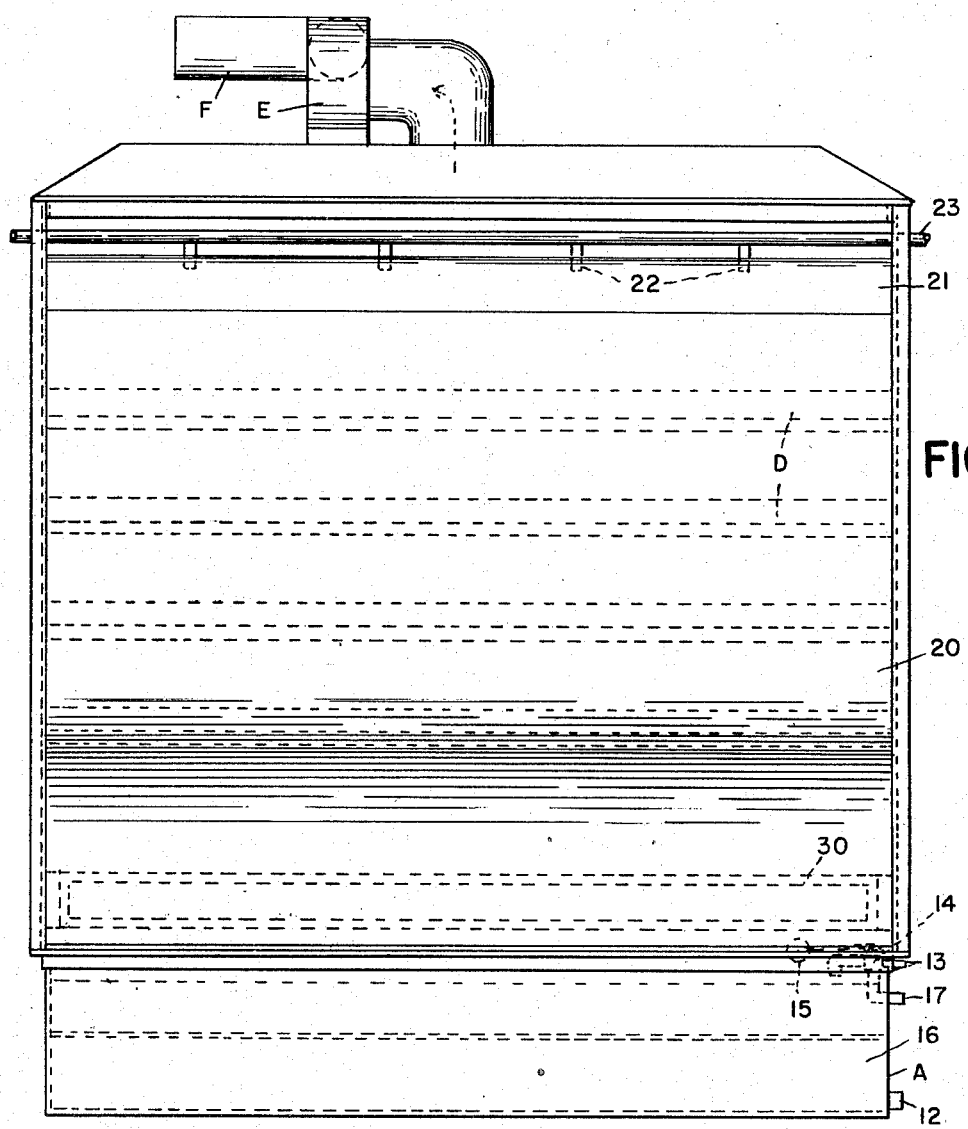
Figure 1 is a front elevation of an air cleaner embodying my invention.
Figure 4:
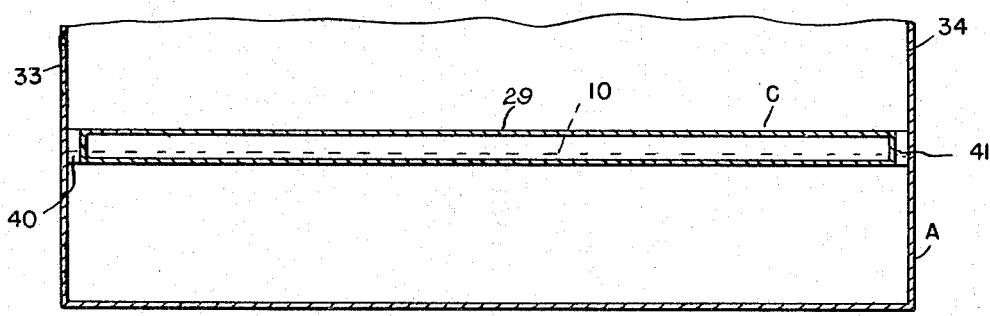
Figure 4 is a sectional view taken substantially on the line 4—4 of Figure 3.

Referring now to the drawings, A is a water tank or trough, B is a cleaning chamber or casing rising from said trough and adapted to constitute one side or be located at one side of a paint spray room or chamber (not shown), C is a high velocity duct through which paint laden air from the spray booth or room may enter the cleaning chamber B, D are staggeredly arranged baffles inclining downwardly and inwardly from opposite upright walls of the cleaning chamber, and E is a blower or fan at the top of the cleaning chamber cooperating with the duct C to effect the high velocity of air therein and for drawing the air upwardly past the baffles D in the chamber B to a suitable duct F which may lead back to the spray booth or chamber.

As shown, the tank A is adapted to be filled with water up to the level line 10 and contains an overflow chamber 11 and a drain 12. Preferably water from a suitable source is supplied to the tank by means of a pipe 13 containing a valve 14 that is operated automatically by a float 15 adapted to ride on the water in the tank. Such valve and float combination may be any suitable construction for controlling the flow of water through the pipe 13 to the tank A.

The overflow chamber 11 is provided upon a wall 16 of the tank to receive any excess water delivered to the tank during the operation of the device and is provided with an outlet pipe 17 which may, if desired, be provided with a manually operable valve.

The drain 12 is at the bottom of the tank A and is provided with a manually operable valve (not shown) that normally is closed.

The cleaning chamber B has an upright wall 20 that faces the space where the paint spraying is done and inclines or curves downwardly and outwardly from the open upper end of the chamber B to a point adjacent the tank A and thence inwardly to the high velocity duct C. Adjacent its upper end the wall 20 is provided upon its outer side with a trough 21 that is adapted to receive water from one or more depending outlets 22 of a substantially horizontal supply pipe 23 so that the water overflowing said trough will pass downwardly in the form of a sheet upon the outer side of the wall 20 and then will fall substantially vertically in the form of a curtain 24 from said wall into the tank A. Thus, the water flowing downwardly upon the outer side of the wall 20 will wash downwardly into the tank paint particles that otherwise would lodge on said wall, and the water curtain 24 falling downwardly from said wall into the tank will provide a screen for the paint laden air drawn into the high velocity duct C. Thus, the curtain 24 of water constitutes the initial cleansing medium for the paint laden air.

In the present instance the high velocity duct C is in the form of a tube that has the inlet end portion 29 thereof partially submerged in the water in the tank A and has an upwardly inclined upwardly flaring portion 30 that discharges toward the upright wall 31 of the chamber. Thus, water in the tank A will be picked up and commingled with the paint laden air as it is drawn through the duct C, and the mixture of air and water will be forcibly discharged against the upright wall 31 of the chamber. At this point the paint laden air undergoes a second cleansing operation by virtue of the particles in the air becoming weighted with water commingled therewith and dropping into the tank or by being washed downwardly into the tank by the water separated from the upwardly flowing air upon engagement thereof with the upright wall 31 of the chamber.

The air and remaining paint particles and water carried thereby are then drawn upwardly by the blower E into contact with the undersides of the baffles D where successive cleansing operations take pace inasmuch as the water becomes separated from the air on the undersides of the baffles and carries such particles downwardly with it to the tank A. In this connection it will be noted that the high velocity duct C is spaced from opposite side walls 33 and 34, respectively, of the cleaning chamber B so that water and paint particles carried thereby dripping or draining downwardly from the baffles D may flow between the duct C and the side walls 33 and 34 into the tank A without collecting in the trough 35 formed by the inwardly inclined portion 36 of the wall 20 and the high velocity duct C.

To prevent air reaching the interior of the cleaning chamber B except through the duct C, there are suitable headers 40 and 41, respectively, between the duct C and the walls 33 and 34 of the chamber to prevent air by-passing around the duct C into said chamber. Also, there are two baffles 42 and 43, respectively, that extend downwardly into the water tank A at spaced points thereof. The baffle 42 projects downwardly from the underside of the duct C and prevents air from the space 44 in front of the inlet from passing below the same and up into the chamber B, while the baffle 43 projects downwardly from the upright wall 31 and prevents air from a clean-out opening 45 from entering the chamber B. After being separated from the paint laden air within the chamber B, the particles fall into the tank A, however, the baffle 42 cooperates with the duct C to prevent any of the lighter particles floating on the water in the tank in rear of said duct from reaching the area of water in front of the inlet end portion 29 of said duct. Usually the clean-out opening 45 is uncovered but may be normally closed, if desired, by any suitable means. In any event, the clean-out opening 45 is so constructed and arranged that access to the water tank A is provided so that paint particles collecting on the bottom thereof may be reclaimed.

In the present instance paint particles sometimes collect upon the upright wall 31, hence a door 50 is provided therein so that the paint particles thereon may be removed and cleaned therefrom. If desired, the lowermost baffle D may be carried by this door 50, as illustrated in Figure 3. Likewise the baffle 43 may be carried by and project downwardly from this door 50. Above the door 50 is another door 51 which may be removed to afford access to the baffles D so that they may be inspected and cleaned. Both doors 50 and 51 may be mounted and held in closed position by any suitable means.

In use, the water-fall on the outer side of the wall 20 will wash paint particles downwardly into the tank A, and the curtain 24 of water falling from said wall 20 in front of the duct C will screen and wash the paint laden air before it enters said inlet. This washed or screened air will then be drawn at relatively high velocity through duct C by the blower E. The action of the air passing through the duct C will pick up water from the tank A, especially the water in which the duct C is submerged, and will cause it to be commingled with whatever paint particles remain in the air after being washed by the water curtain 24. The mixture in the flaring portion 30 of the duct C will be discharged toward and against the upright wall 31 where the water will separate additional particles from the air and cause them to be deposited into the tank A. If any paint particles still remain in the air they will be carried downwardly by water dripping from the undersides of the baffles D with which they contact on the upward travel of the air in the chamber B. Thus, the air is substantially clean and free of objectionable paint particles when it is drawn out of the top of the chamber B by the blower E and discharged thereby into the duct F leading back to the spray booth or room.

In Figure 5 I have illustrated a slight modification wherein air instead of water is used upon the outer side of the wall 20$^a$ to wash downwardly toward and into the tank A the paint particles that otherwise might lodge upon said wall. Preferably the velocity of the air employed is relatively high. The volume of such air may be comparatively small. As shown, a header 60 for air from a suitable blower or fan 61 is carried upon the inner side of the wall 20$^a$ at the top thereof and has an inverted L-shaped portion 62 that overhangs and cooperates with the outer side of said wall to provide a relatively narrow downwardly opening outlet passageway 63 through which a jet of air may flow downwardly over the outer surface of the wall 20$^a$ to wash paint particles toward and into the tank A. The heavier particles of paint, dust, etc., directed downwardly by the jet of air just mentioned will be deposited into the water tank A, while the lighter particles will be picked up by the high velocity air duct C and directed into the cleaning chamber B, where the cleansing action is the same as that previously described in connection with Figure 3.

What I claim as my invention is:

1. In an apparatus for removing particles from particle laden air, the combination with a tank for water, an upright casing rising from said tank, the lower end portion of one upright wall of said casing inclining inwardly toward the center of said casing, and means for maintaining the water in said tank at a predetermined level, of means at the lower end of the inwardly inclined end portion of said casing forming an open ended imperforate duct through which particle laden air from outside the casing may enter said casing, the inlet end portion of said duct being substantially straight and being partially submerged in water in the tank so that said inlet portion will constantly contain water to be commingled in said duct with particle laden air passing therethrough, the outlet end portion of said duct being also substantially straight, said outlet portion inclining upwardly from said inlet portion and discharging toward an opposite upright wall of said casing, means carried by said upright casing above said duct for creating suction in said duct so that particle laden air will be drawn through the duct into the casing and water in the inlet portion of the duct will be drawn upwardly in said duct to be commingled with the particle laden air as it is drawn through the duct as aforesaid, and means cooperating with the duct to prevent particles floating on the water in the tank in rear of said duct from reaching the area of water in front of the inlet end portion of said duct, including a substantially vertical baffle projecting down within the water in the tank from the underside of said duct and terminating short of the bottom of said tank.

2. In an apparatus for removing particles from particle laden air, the combination with a tank for water, an upright casing rising from said tank, and means for maintaining the water in said tank at a predetermined level, of means at the lower end of the forward wall of said casing forming an imperforate duct through which particle laden air from outside the casing may enter said casing, the inlet end portion of said duct being substantially straight and being partially submerged in water in the tank so that said inlet end portion will constantly contain water to be commingled in said duct with particle laden air passing therethrough, the outlet end portion of said duct being also substantially straight, said outlet portion inclining upwardly from said inlet portion and discharging toward the rear upright wall of said casing, means, carried by said upright casing for creating suction in said duct so that particle laden air will be drawn through the duct into the casing and water in said duct will be drawn upwardly in said duct to be commingled with the particle laden air as it is drawn through the duct as aforesaid, and means cooperating with the duct to prevent particles floating on the water in the tank in rear of said duct from reaching the water drawn upwardly in said duct, including a baffle projecting down within the water in the tank from the underside of said duct and terminating short of the bottom of said tank.

JOHN E. LUDWIG, SR.